(12) United States Patent
McLeod et al.

(10) Patent No.: US 7,221,696 B1
(45) Date of Patent: May 22, 2007

(54) COMMUNICATION SYSTEM AND METHOD FOR ACQUIRING PSEUDONOISE CODES OR CARRIER SIGNALS UNDER CONDITIONS OF RELATIVELY LARGE CHIP RATE UNCERTAINTY

(75) Inventors: Gene Allan McLeod, Herndon, VA (US); Aaron Weinberg, Potomac, MD (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 904 days.

(21) Appl. No.: 10/376,450

(22) Filed: Mar. 3, 2003

(51) Int. Cl.
 *H04B 1/707* (2006.01)
(52) U.S. Cl. .................. 375/140; 375/326; 342/357
(58) Field of Classification Search ........... 375/130, 375/134, 136–137, 140, 142, 143, 326, 329, 375/339, 149; 342/357
See application file for complete search history.

(56) References Cited

U.S. PATENT DOCUMENTS

| | | | |
|---|---|---|---|
| 4,538,281 A | | 8/1985 | Rajan |
| 4,689,626 A | * | 8/1987 | Hori et al. ............. 342/357.12 |
| 5,285,472 A | | 2/1994 | Leonard et al. |
| 5,313,491 A | | 5/1994 | Schramm et al. |
| 5,619,524 A | * | 4/1997 | Ling et al. .................. 375/130 |
| 5,642,377 A | | 6/1997 | Chung et al. |
| 5,696,762 A | | 12/1997 | Natali et al. |
| 5,914,943 A | | 6/1999 | Higuchi et al. |
| 5,974,080 A | | 10/1999 | Papasakellariou |
| 6,055,264 A | | 4/2000 | Kenney et al. |
| 6,069,915 A | | 5/2000 | Hulbert |
| 6,111,868 A | | 8/2000 | Lee et al. |
| 6,111,911 A | | 8/2000 | Sanderford, Jr. et al. |
| 6,363,049 B1 | * | 3/2002 | Chung ........................ 370/210 |
| 6,366,599 B1 | * | 4/2002 | Carlson et al. ............. 375/130 |
| 6,389,058 B1 | | 5/2002 | Lee et al. |
| 6,490,315 B2 | * | 12/2002 | Katz et al. .................. 375/149 |
| 6,512,478 B1 | * | 1/2003 | Chien .................... 342/357.09 |
| 6,839,380 B1 | * | 1/2005 | Ding et al. ................. 375/149 |
| 2002/0084933 A1 | * | 7/2002 | Krasner ................ 342/357.01 |
| 2006/0198427 A1 | * | 9/2006 | Sullivan ..................... 375/147 |

* cited by examiner

*Primary Examiner*—Kevin Burd
*Assistant Examiner*—Freshteh N Aghdam
(74) *Attorney, Agent, or Firm*—Edell, Shapiro & Finnan, LLC

(57) ABSTRACT

A Spread Spectrum system acquires signals with frequency uncertainty. The present invention independently computes the number of frequency bands necessary to cover the carrier frequency uncertainty and the chip rate uncertainty and uses the largest of the two quantities in the acquisition process. A receiver cycles through pseudonoise code phases until a matched filter output exceeds a threshold. The local code is adjusted based on that code phase and the signal is processed for carrier acquisition, where an FFT estimates the carrier frequency. The code phase and nearest neighbors are used to determine the presence of a false alarm. When a false alarm is absent, the detection is examined for an alias or noise spur. If an alias is absent, the signal search is complete. Otherwise, processing continues to search for a pseudonoise code. The process continues by examining all code phases for each band until a signal is detected.

22 Claims, 6 Drawing Sheets

BPSK CARRIER ACQUISITION BLOCK DIAGRAM
PRIOR ART

COMMUNICATION SYSTEM AND METHOD FOR ACQUIRING PSEUDONOISE CODES OR CARRIER SIGNALS UNDER CONDITIONS OF RELATIVELY LARGE CHIP RATE UNCERTAINTY

BACKGROUND OF THE INVENTION

1. Technical Field

The present invention pertains to communication systems. In particular, the present invention pertains to acquisition of pseudonoise codes or carrier signals during conditions of relatively large chip rate uncertainty. The present invention is typically applied to Direct Sequence Spread Spectrum systems, where waveforms are employed in the form of coded spread spectrum signals and the signals are expanded in bandwidth via a pseudonoise or spreading code.

2. Discussion of Related Art

Generally, wireless communication systems employ a carrier signal to transport information between sites. Information is basically modulated onto the carrier signal for transmission. A conventional modulating technique employed by communication systems is Binary Phase Shift Keying (BPSK). This technique basically shifts the phase of a signal based on the value of a digital bit stream. For example, a logical one value in the bit stream causes the signal to be shifted in phase, while no phase shift is produced in response to a logical zero value in the bit stream (e.g., this is commonly referred to as an NRZ type scheme).

A receiver receives a signal from the environment and attempts to acquire or determine the presence of the carrier signal within the received signal. Once the carrier signal is acquired, the information transported by the carrier signal may be retrieved. A conventional architecture employed for carrier acquisition of a modulated, non-spread signal is illustrated in FIG. 1. In particular, a received bandpass signal, $S_{bp}(t)$, is combined with white noise, w(t), having a power spectral density of $N_0$ via a summer 10. The bandpass signal is basically a form of the input signal received by the receiver from the environment. This signal is a function of the received carrier signal frequency and may be expressed as follows:

$$S_{bp}(t)=x(t)[\cos(2\pi f_r t)-\sin(2\pi f_r t)],$$

where $f_r$ is the received carrier frequency and x(t) is a random binary wave (e.g., a random sequence of binary symbols). The binary symbols have amplitude values of "+A" and "−A" (e.g., each amplitude value occurring with equal probability), and a duration of $1/R_s$ seconds, where $R_s$ is the signaling rate. For uncoded signals, the signaling rate, $R_s$, typically equals the data rate, $D_r$. For rate one-half coded signals, the signaling rate is equal to twice the data rate (e.g., $R_s=2D_r$).

The combined signal from summer 10 is filtered by a bandpass filter 12. The bandpass filter generally produces portions of the combined signal within a desired frequency range, thereby removing spurious signal components. The filtered signal is applied to a mixer 14 that mixes the filtered signal with a local carrier signal, l(t). The local carrier signal may be expressed as follows:

$$l(t)=e^{j2\pi f_l t}$$

where $f_l$ is the local carrier frequency.

The mixed signal from mixer 14 is applied to a low pass filter 16 to produce a baseband signal, $S_{bb}(t)$. The lowpass filter basically serves to produce desired baseband signal components from the mixed signal. Since the local carrier signal frequency typically differs from the received carrier signal frequency, the resulting baseband signal is a function of the difference between those frequencies and may be expressed as follows:

$$S_{bb}(t)=x(t)e^{j2\pi\Delta f t}+n_i(t)+jn_q(t),$$

where $\Delta f$ is the baseband carrier offset or the difference between the received carrier signal frequency, $f_r$, and the local carrier signal frequency, $f_l$ (e.g., $\Delta f=f_r-f_l$). The variables $n_i(t)$ and $n_q(t)$ within the complex expression are independent gaussian random variables that serve as thermal noise components. Carrier acquisition basically attempts to measure the baseband carrier offset in order to determine the received carrier frequency.

The precise optimal sample rate for carrier acquisition depends on the sequence of binary symbols produced by the process x(t). Since this binary sequence is generally not known, the sampling rate, $f_s$, for the NRZ symbol format described above may be set to twice the signaling or modulation rate (e.g., $f_s=2R_s$). In the case of a bi-phase symbol format, the sampling rate, $f_s$, may be set to four times the signaling rate (e.g., $f_s=4R_s$). Increased rates of sampling are not practical due to the prohibitive squaring losses imposed by the data stripping function described below. Lower rates of sampling are similarly not practical due to signal cancellation or loss associated with data transitions in x(t), and the pulse shape with respect to bi-phase symbol formats.

The baseband signal is applied to a data stripping module 18. The data stripping module basically produces a phasor to enable measurement of the baseband carrier offset and performs the following function:

$$I_{out}=2I_{in}Q_{in} \quad \text{(Equation 1)}$$

$$Q_{out}=I_{in}I_{in}-Q_{in}Q_{in} \quad \text{(Equation 2)}$$

where "I" and "Q" respectively indicate the In-phase and Quadrature (e.g., complex) signal components and the subscripts "in" and "out" respectively represent the input and output of the data stripping module. The spectrum of the input baseband signal to the data stripping module includes a sinc function in noise centered at the baseband carrier offset, $\Delta f$. The spectrum of the output signal from the data stripping module includes a spectral line (e.g., tone) in noise. The spectral location of this line is twice the baseband carrier offset, $\Delta f$. This is commonly referred to as the "frequency doubling effect".

The output of the data stripping module is directed to an FFT and peak search module 20. This module basically measures the baseband carrier offset, $\Delta f$. In general, the one sided bandwidth of a complex Fast Fourier Transform (FFT) is one-half of the sampling rate (e.g., $f_s/2$), while the resolution of the FFT is the sampling rate divided by the FFT size (e.g., $f_s/N_{fft}$, where $N_{fft}$ is the FFT size or quantity of stages (e.g., log base two of the number of points) within the FFT)). However, due to the frequency doubling of the output signal from the data stripping module, the one sided bandwidth of the FFT is effectively reduced to one-quarter of the sampling rate (e.g., $f_s/4$), while the resolution is reduced by half (e.g., $f_s/(2N_{fft})$). If the absolute value of the baseband carrier offset is less than the one-sided bandwidth (e.g., $|\Delta f|<f_s/4$), the Nyquist criteria is satisfied and the position of the maximum or peak value within the FFT output (e.g., the FFT basically produces an array of bins each associated with a magnitude, where the peak value is the largest magnitude within an array element or bin) corresponds to the baseband carrier offset, $\Delta f$ (e.g., when the signal to noise ratio (SNR) is of a sufficiently high magnitude). When the absolute value of the baseband carrier offset is greater than the one-sided FFT bandwidth (e.g., $|\Delta f| > f_s/4$), the Nyquist criteria is not satisfied and aliasing occurs. In this case, the peak value position within the FFT output generally does not correspond to the baseband carrier offset, $\Delta f$, and the measurement is corrupted.

In cases where the frequency uncertainty is large with respect to data rate (e.g., when the local carrier frequency, $f_l$, may not be sufficiently close to the received carrier frequency, $f_r$, to produce a baseband carrier offset of a sufficient magnitude to satisfy the Nyquist criteria), the carrier acquisition process must partition the frequency uncertainty region into discrete bands. These bands form a series of local carriers, $l_i(t)$, spaced evenly in frequency throughout the entire frequency uncertainty region. Each local carrier, $l_i(t)$, represents a frequency band, and an FFT and peak search is performed for each band. The center frequency for each band is the frequency of the band local carrier, $f_l(i)$. The bands in the series are processed sequentially, where the number of bands in the series is selected to ensure that at least one of the local carriers, $l_i(t)$, is sufficiently close in frequency to the received carrier frequency, $f_r$, to satisfy the Nyquist criteria (e.g., $|f_r - f_l(i)| < f_s/4$).

The minimum number of bands required to guarantee that the Nyquist criteria will be satisfied for at least one local carrier, considering the one sided frequency uncertainty and the sample rate, may be expressed as follows:

$$N_B = \text{floor}\left(\frac{\delta}{f_s/4}\right) + 1 \quad \text{(Equation 3)}$$

where $N_B$ is the number of bands, $\delta$ is the one sided frequency uncertainty, and $f_s$ is the sample rate.

The local carrier frequencies, $f_l(i)$, may be determined as follows based on the number of bands, $N_B$, and the one sided frequency uncertainty, $\delta$:

$$f_l(i) = \frac{2\delta}{N_B}\left[i - \left(\frac{N_B - 1}{2}\right)\right] \quad 0 \leq i \leq N_B - 1 \quad \text{(Equation 4)}$$

The time interval to perform carrier acquisition in a particular band, $T_{car\_acq}$, may be expressed as follows:

$$T_{car\_acq} = T_c + T_p \quad \text{(Equation 5)}$$

where $T_c$ is the time interval to collect the time domain data (e.g., $T_c = N_{fft}/f_s$) and $T_p$ is the time interval to process the time domain data (e.g., the time interval to compute the FFT, conduct the peak search, and render a decision). Accordingly, the carrier acquisition time is based on the sample rate, $f_s$ (e.g., which is based on the data rate and symbol format as described above), the size of the FFT, $N_{fft}$ (e.g., which is based on the signal to noise ratio) and the processing time, $T_p$ (e.g., which is based on processor speed and the size of the FFT, $N_{fft}$).

Signal to noise ratio (SNR) is inversely proportional to the minimum allowable carrier acquisition time. The size of the FFT, $N_{fft}$, is selected to be the minimum value that permits reliable detection of the signal. This is reflected mathematically by the following equation:

$$SNR_{in} - L_{sq} + G_{fft} > SNR_{det} \quad \text{(Equation 6)}$$

where $SNR_{in}$ is the signal to noise ratio of the baseband signal at the input to the data stripping module, $L_{sq}$ is the squaring loss associated with the data stripping function performed by the data stripping module, $G_{fft}$ is the gain associated with averaging a signal in uncorrelated noise, and $SNR_{det}$ is the minimum signal to noise ratio required to reliably detect the signal.

The signal to noise ratio at the data stripping module input, $SNR_{in}$, is a function of data rate, symbol format, minimum energy per bit to noise density power ratio (Eb/No) and implementation loss. The squaring loss, $L_{sq}$, is solely a function of the signal to noise ratio at the data stripping module input, $SNR_{in}$. The gain, $G_{fft}$, is a function of the size of the FFT, $N_{fft}$. A large sized FFT facilitates more averaging, thereby yielding greater signal to noise ratio gain. The minimum signal to noise ratio to reliably detect the signal, $SNR_{det}$, is a constant and determined based on the detection probability deemed to be "reliable".

The size of the FFT, $N_{fft}$, is the only parameter adjustable by a designer for a particular user configuration to satisfy the above Equation 6. Accordingly, the designer determines the minimum size of the FFT (e.g., minimum value of $N_{fft}$) that satisfies the condition in above-described Equation 6. This value can then be inserted into above-described Equation 5 to determine the minimum allowable carrier acquisition time.

The signal processing operations and minimum time required to detect a signal reliably for carrier acquisition of a modulated, non-spread signal is described above. However, a manner of enhancing security and reliability within communication systems includes employment of encoded signals, such as spread spectrum signals. In particular, the operation of a Direct Sequence Spread Spectrum (DSSS) system includes spreading of a baseband signal (e.g., bandwidth expansion) by use of pseudonoise (PN) codes. The frequency rate of the codes greatly exceeds that of the baseband signal, where each transition or code symbol is commonly referred to as a "chip". The codes or chips are basically modulated onto the baseband signal containing data and the resulting signal is mixed with an RF carrier signal and transmitted for reception by the appropriate receiving units. A cross correlation of an incoming signal with a suitable code replica by a digital matched filter (DMF) within the receiving unit produces an energy peak at the exact match, thereby rejecting or filtering other pseudonoise codes and background noise and interference.

Pseudonoise orthogonal or quasi-orthogonal codes may be selected to correlate exactly with a peak power output of the digital matched filter when the incoming signal code and replica codes match, and to produce a filter output of zero when these codes do not match (e.g., even if the codes are offset or shifted by one position). For example, an incoming signal including bi-phase modulated chips or codes is correlated with a stored replica code for a given time interval. Each chip within the incoming signal is multiplied by the corresponding chip in the replica code, where the individual products are summed to produce a correlation result. The filter operation may be expressed as:

$$\sum_{k=1}^{N} c_k r_k$$

where $c_k$ represents the incoming chip sequence, $r_k$ is the stored replica code and N represents the quantity of chips in the code. With respect to an exemplary incoming signal with a code of 1, 1, 1, −1, a correlation value of four is produced when this code is matched exactly to the stored replica code (e.g., the sum of the products of the corresponding chips, or (1×1)+(1×1)+(1×1)+(−1×−1)=4) indicating a peak power output of the filter. However, when an incoming signal with a code of 1, 1, −1, 1 does not match with a stored replica code of 1, 1, 1, −1, the filter provides a correlation value of zero (e.g., the sum of the products of the corresponding chips, or (1×1)+(1×1)+(−1×1)+(1×−1)=0) indicating the absence of a match.

The pseudonoise codes provide a manner for a receiving unit to basically identify and differentiate between messages directed to that unit and other units, and further ensures that other transmissions within the surrounding environment are not erroneously considered as messages addressed to the receiving unit. Moreover, the pseudonoise codes enable secure and reliable communications in the presence of background and/or multi-user interference, while the bandwidth expansion of the baseband signal distributes the signal power over a greater bandwidth, thereby reducing the power spectral density of that signal in maximum amplitude and reducing visibility of the signal in the environment.

The security provided by the pseudonoise codes is based on the requirement that the receivers have knowledge of the specific code being transmitted in order to acquire and demodulate the signal. Accordingly, long or lengthy pseudonoise codes are utilized in some commercial systems, where subsections of the code are used to spread symbols with subsequent symbols being spread by different subsections. This is typically employed by military systems having security as a key requirement.

Signal to Noise Ratio (SNR) is commonly defined as the ratio of the average signal power to the average noise power and is preferably measured in decibels. The average signal power is determined over the signal bandwidth, where the bandwidth for a spread spectrum signal is greater than that for a narrowband or baseband signal. For example, a baseband signal with 25 KHz of bandwidth and expanded at a ratio of one-hundred produces a spread signal with 25 KHz*100=2.5 MHz. The baseband signal includes, for a transmitted power of one Watt, a signal power of 1/25 KHz=0.040 Watts/Hz or 40 milliWatts/Hz, while the spread signal includes 1/2.5 MHz=400 NanoWatts/Hz. Thus, the spectral density of the narrowband or baseband signal contains more power in a narrow band, while the spread signal contains the same power for a sufficiently greater bandwidth with a lower peak power. This enables the spread signal to reside within or be camouflaged by the environment noise.

With respect to Direct Sequence Spread Spectrum, PN acquisition is the process of estimating the phase of a received pseudonoise code and adjusting the local code to the phase estimate to place the local and received codes substantially in phase (e.g., within one-half of a chip). If the local and received pseudonoise codes are substantially in phase, the despreading process produces a signal similar to a non-spread baseband signal (e.g., $S_{bb}(t)$ in FIG. 1) with some loss in signal amplitude that is proportional to the phase difference between the local and received codes. This applies only when the received and local pseudonoise codes are substantially in phase. If the received and local pseudonoise codes are out of phase (e.g., a phase difference greater than one chip), this produces minimal or no signal amplitude, thereby preventing carrier acquisition.

When the local and received pseudonoise codes are substantially in phase after PN acquisition and include identical chip rates, carrier acquisition for Direct Sequence Spread Spectrum signals is substantially similar to carrier acquisition for non-spread signals described above (e.g., except for some additional implementation loss due to the fact that PN acquisition does not perfectly match the phases of the two codes). However, the chip rates of the local and received pseudonoise codes are generally not identical prior to PN tracking (e.g., tracking is a process that follows carrier acquisition). Therefore, the initial phase alignment (e.g., within one-half of a chip) from PN acquisition is temporary and the local and received code phases eventually drift apart due to the difference in chip rates. In other words, the difference in chip rates between the received and local pseudonoise codes imposes a "time limit" upon carrier acquisition (e.g., a maximum allowable carrier acquisition time). If this "time limit" is less than the minimum allowable carrier acquisition time (e.g., $T_{car\_acq}$ of Equation 5), the local and received code phases may drift apart during that acquisition time and a condition of "large chip rate uncertainty" exists. Signal acquisition under this condition with conventional acquisition techniques is either unreliable (e.g., best case scenario) or impossible (e.g., worst case scenario).

OBJECTS AND SUMMARY OF THE INVENTION

Accordingly, it is an object of the present invention to reliably perform signal acquisition under conditions of relatively large chip rate uncertainty.

It is another object of the present invention to reliably perform signal acquisition under conditions of large chip rate uncertainty by considering chip rate uncertainty when determining the quantity of bands to utilize for the signal acquisition.

The aforesaid objects may be achieved individually and/or in combination, and it is not intended that the present invention be construed as requiring two or more of the objects to be combined unless expressly required by the claims attached hereto.

According to the present invention, a Spread Spectrum Communication system acquires signals reliably during conditions of chip rate uncertainty by dividing the carrier acquisition process into frequency bands. The number of bands utilized is the greater of the quantity of bands required for chip rate uncertainty or the quantity of bands required for carrier frequency uncertainty. Initially, a spread spectrum receiving unit cycles through each pseudonoise code phase in a circular fashion until one of the code phases produces a matched filter output exceeding a threshold, thereby indicating detection of a signal. The local code is adjusted based on the code phase of the output that exceeded the threshold to be substantially in phase (e.g., within one half of a chip) with the received code and the signal is processed for carrier acquisition in a manner similar to that described above for a non-spread signal. The greatest magnitude produced by the FFT during carrier acquisition processing is used to estimate the carrier frequency, where the local carrier frequency and chip rate are adjusted accordingly.

The code phase that produced a threshold crossing during the initial code search is utilized along with the nearest neighbors of that code phase to determine the presence of a false alarm. In particular, the adjusted local carrier frequency and chip rate are employed, while the original code phase and the nearest neighbors are applied to the digital matched filter to determine the presence of another threshold crossing. If another threshold crossing is produced by any of these code phases, a false alarm is not present and aliasing processing commences as described below. Otherwise (e.g., the threshold is not crossed), a false alarm is present and a search for a pseudonoise code continues by cycling through code phases in the manner described above.

When a false alarm is not present, the initial peak of the FFT is examined for an alias or noise spur. Specifically, the local code is adjusted based on the code phase of the largest magnitude produced during false alarm processing. This is typically either the same code phase from the initial search for a pseudonoise code or one of the neighbors. An estimate of the frequency is determined via an FFT in the manner described above. If the greatest magnitude of the FFT is close to the FFT "DC component", the prior carrier frequency estimate or FFT peak was not an alias or a noise spur since the local frequency was "tuned" close to that frequency immediately following the prior estimate. Thus, the signal search is complete. Otherwise (e.g., the greatest FFT magnitude is not close to the FFT "DC component"), the prior carrier frequency estimate or FFT peak value presumably was an alias or a noise spur, and processing continues to search for a pseudonoise code by cycling through the code phases as described above.

This process continues until a signal is detected or all code phases for a band are examined. Once the code phases for a band are exhausted, the receiving unit oscillator or tuner tunes to the next band in the sequence for processing in the manner described above.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

DETAILED DESCRIPTION OF THE PREFERRED EMBODIMENTS

Wireless communication systems generally employ a carrier signal to transport information between sites. Information is basically modulated onto the carrier signal for transmission. A conventional modulating technique employed by communication systems is Binary Phase Shift Keying (BPSK). A receiver receives a signal from the environment and attempts to acquire or determine the presence of the carrier signal within the received signal. Once the carrier signal is acquired, the information transported by the carrier signal may be retrieved.

Conventional carrier acquisition techniques basically attempt to measure the baseband carrier offset which is equal to the difference between the received carrier frequency and the local carrier frequency as described above. Briefly, a baseband signal, $S_{bb}(t)$, is initially generated by filtering and mixing. The baseband signal is applied to a data stripping function to produce an output signal with a spectral line having a spectral location twice the baseband carrier offset. An FFT and peak search measure the baseband carrier offset as described above. The Nyquist criteria is satisfied when the baseband carrier offset is less than the sampling rate divided by four as described above. When this occurs, the position of the FFT output peak value corresponds to the baseband carrier offset.

In cases where the frequency uncertainty is large with respect to data rate (e.g., when the local carrier frequency may not be sufficiently close to the received carrier frequency to produce a baseband carrier offset of a sufficient magnitude to satisfy the Nyquist criteria), the carrier acquisition process must partition the frequency uncertainty region into discrete bands as described above. These bands form a series of local carriers spaced evenly in frequency throughout the entire frequency uncertainty region that are stepped through sequentially. A designer typically determines the smallest size of an FFT that permits reliable acquisition of a signal with an acceptable signal to noise ratio and within the minimum allowable acquisition time. This time is based on the sampling rate, size of the FFT and processing time.

Spread Spectrum communication systems enhance security and reliability within communication systems by employing encoded signals, such as spread spectrum signals. Direct Sequence Spread Spectrum systems basically spread or expand the bandwidth of a baseband signal via pseudonoise codes that include a greater frequency rate than the baseband rate. The codes are modulated onto the baseband signal and the resulting signal is mixed with an RF carrier signal for transmission. A receiving unit matches the transmitted codes to stored replicas via digital matched filters as described above.

Figure 2:
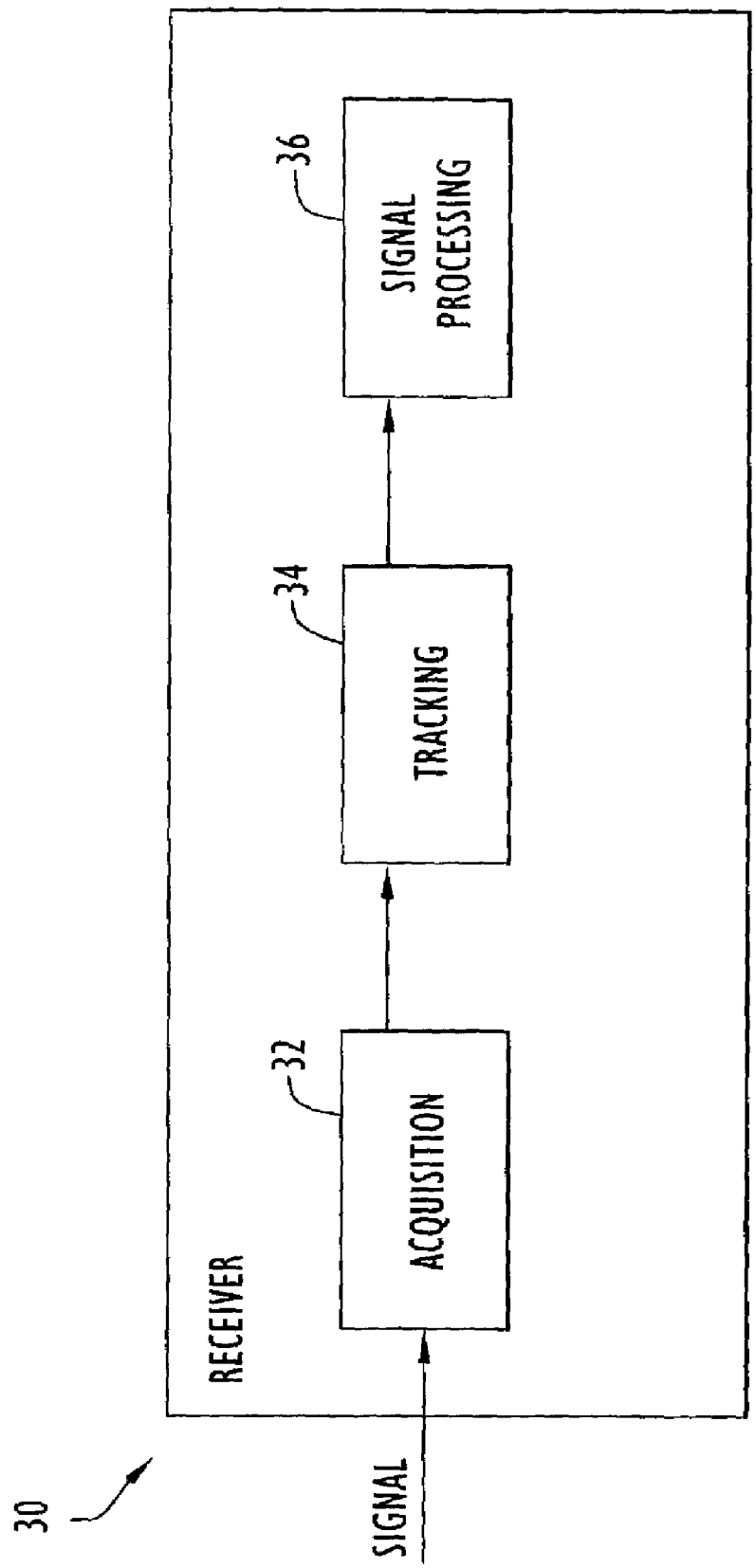
FIG. 2 is a block diagram of an exemplary Spread Spectrum receiving unit employing PN code or carrier acquisition according to the present invention.

An exemplary spread spectrum receiving unit is illustrated in FIG. 2. Specifically, receiving unit 30 includes an acquisition module 32, a tracking module 34 and a signal processing module 36. The acquisition module basically acquires signals to determine the presence of appropriate PN codes. The phase of the received PN code is estimated and the local code is adjusted to the phase estimate to enable the local and received codes to be substantially in phase (e.g., within half of one chip) as described above. Once a PN code has been acquired, tracking module 34 maintains alignment between the received and local codes to facilitate continued reception of signals. Signal processing module 36 processes the resulting non-spread signal to retrieve information therefrom for the particular application. The modules are typically implemented by conventional components or circuitry, such as those employed in standard communication systems.

The initial phase alignment between the local and received codes during pseudonoise (PN) code acquisition is temporary, where the local and received code phases eventually drift apart due to the difference in chip rates. In other words, the difference in chip rates between the received and local pseudonoise codes imposes a "time limit" upon carrier acquisition (e.g., a maximum allowable carrier acquisition time). If this "time limit" is less than the minimum allowable carrier acquisition time, a condition of "large chip rate uncertainty" exists. Signal acquisition under this condition with conventional acquisition techniques is either unreliable or impossible as described above.

Accordingly, the present invention is utilized within acquisition module 32 to reliably acquire signals during conditions of large chip rate uncertainty. The present invention divides the carrier acquisition process into frequency bands. The number of bands utilized is the greater of the quantity of bands required for chip rate uncertainty or the quantity of bands required for carrier frequency uncertainty. The number of bands required for carrier frequency uncertainty may be determined from above-described Equation 3, while the minimum number of bands necessary to acquire the signal, based on chip rate uncertainty, may be expressed as follows:

$$N_B = 1 + \text{floor}\left[\frac{\Delta R_c T_{acq}}{\Delta C_{max}}\right] \quad \text{(Equation 7)}$$

where the acquisition time, $T_{acq}$, is the sum of the carrier acquisition time, $T_{car\_acq}$, and pseudonoise code acquisition time, $T_{pn\_acq}$ (e.g., $T_{acq} = T_{car\_acq} + T_{pn\_acq}$), $\Delta R_c$ is the chip rate uncertainty (e.g., maximum chip rate difference between the local and received PN codes) and $\Delta C_{max}$ is the maximum allowable chip drift over the acquisition time interval. In many applications, the number of bands for chip rate uncertainty is greater than that for carrier frequency uncertainty.

Figure 1:
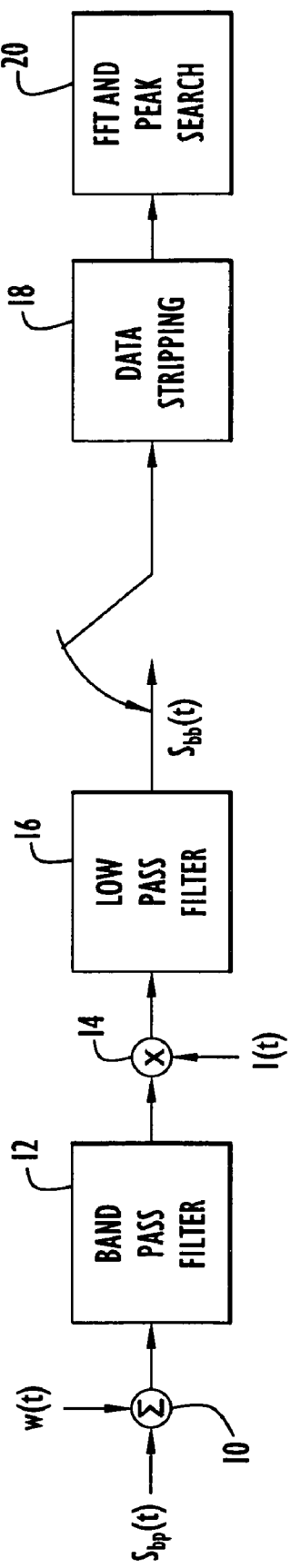
FIG. 1 is a block diagram of conventional signal acquisition for a signal modulated via Binary Phase Shift Keying (BPSK).
Figure 3:
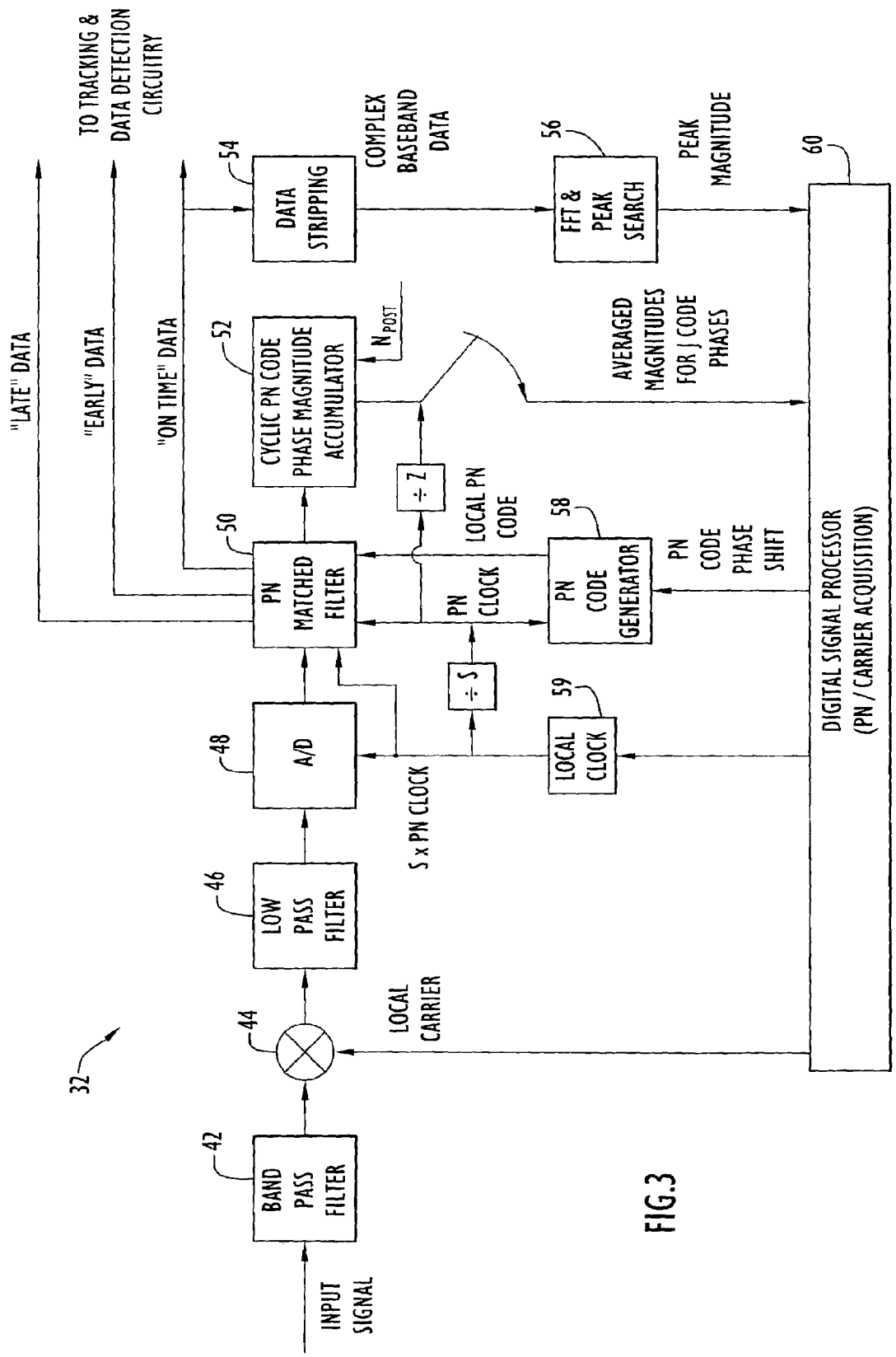
FIG. 3 is a block diagram of an acquisition module employing PN code or carrier acquisition according to the present invention.

An exemplary acquisition module to perform PN acquisition under conditions of large chip rate uncertainty according to the present invention is illustrated in FIG. 3. Specifically, acquisition module 32 includes a band pass filter 42, a mixer 44, a low pass filter 46, an analog to digital (A/D) converter 48, a PN matched filter 50, a data stripping module 54, an FFT and peak search module 56 and a digital signal processor 60. The band pass filter, mixer, low pass filter, data stripping module and FFT and peak search module are substantially similar to the corresponding components described above for FIG. 1. Band pass filter 42 receives an input signal to provide frequency components of that signal within a desired frequency range. The filtered signal is applied along with a local carrier signal to mixer 44 to produce a mixed signal. The frequency of the local carrier signal is typically controlled by signal processor 60. The mixed signal includes In-Phase (I) and Quadrature (Q) components and is applied to low pass filter 46. The lowpass filter basically serves to produce the desired spread signal components from the mixed signal. Since the local carrier signal frequency typically differs from the received carrier signal frequency, the resulting signal is a function of the difference between those frequencies as described above. A/D converter 48 digitizes the filtered in-phase and quadrature signal components and is driven by a local clock 59 controlled by digital signal processor 60. The local clock serves to control the chip rate for the local and received codes. The clock typically produces sampling clock signals having a frequency of the chip rate multiplied by the quantity of samples for each chip, S.

The digitized signals are applied to PN matched filter 50 that determines the presence of a pseudonoise code and produces a non-spread signal based on a local code. The matched filter basically correlates the samples of the received code to the chips of the local code as described below, where the local code is received from a PN code generator module 58. The matched filter and code generator receive code clock signals having a frequency of the chip rate. These signals are derived from the sampling clock signals produced by local clock 59. The code generator module produces the local code in accordance with the code clock signals and code phase shift information received from digital signal processor 60. A code phase magnitude accumulator 52 receives correlation information from matched filter 50 and produces an average magnitude value for each of a plurality of code phases. The signal processor utilizes these magnitude values to determine the presence of a threshold crossing for signal detection as described below. The accumulator receives a parameter indicating the quantity of post detection accumulations, $N_{post}$, to perform in order to produce the averaged magnitudes as described below. This parameter may be predetermined or entered by a user.

Figure 4:
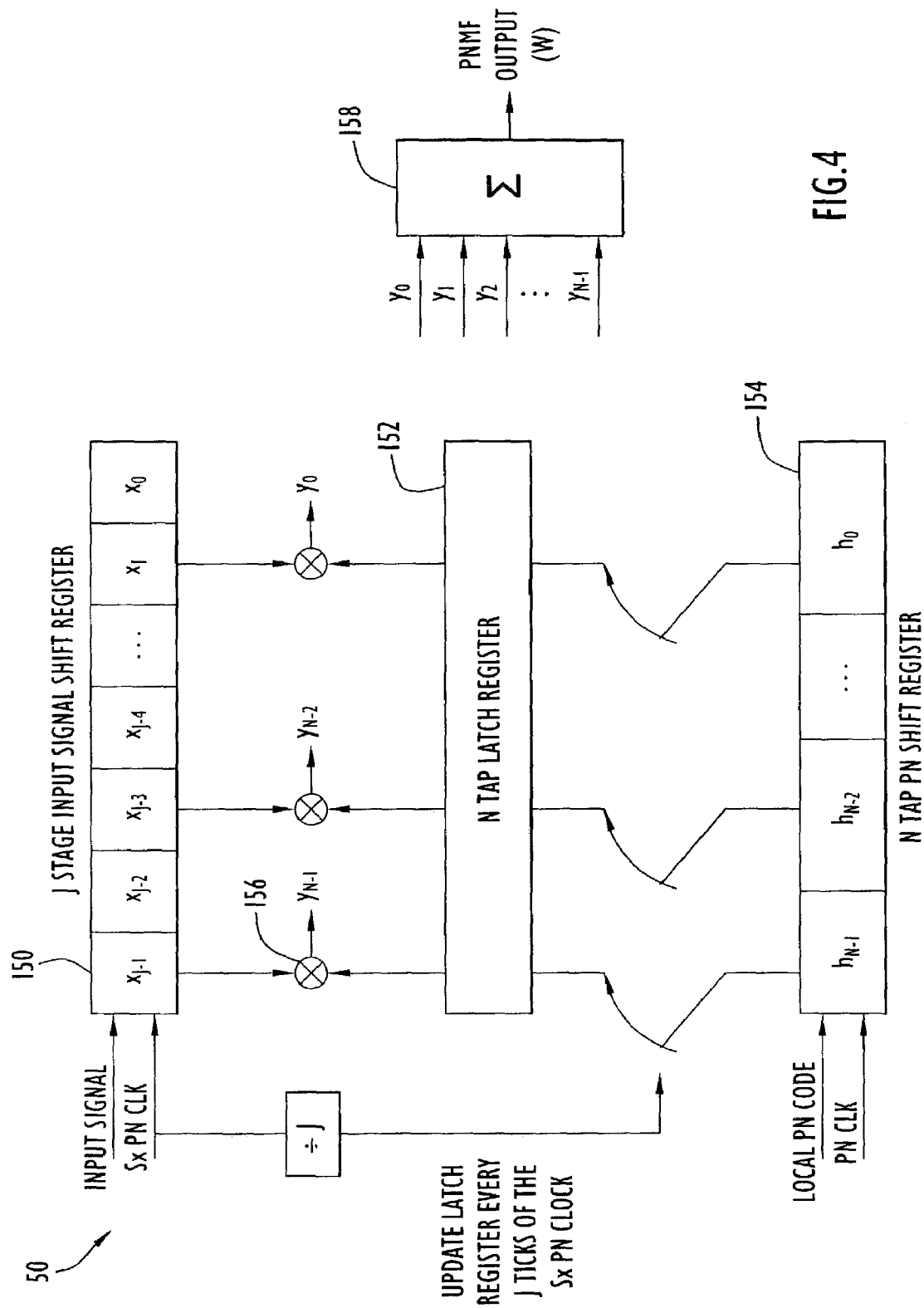
FIG. 4 is a block diagram of an exemplary PN matched filter that may be employed by the present invention.

An exemplary matched filter that may be employed by the present invention is illustrated in FIG. 4. The matched filter basically determines correlations between the received and local codes for a plurality of code phases, J. By way of example only, the matched filter is configured to produce correlation values for 256 code phases at one time, however, the filter may accommodate any quantity of code phases. The received signal and local codes are processed in segments to produce partial correlations for the J code phases of each segment. The partial correlations of segments with a common code phase may be combined to produce a code phase magnitude for that code phase as described below. The matched filter is illustrated, by way of example only, with respect to sampling the input signal twice for each chip, but may be configured for any sampling rates. Specifically, the matched filter includes an input signal shift register 150, a latch register 152, a local code shift register 154, multipliers 156 and summer 158. These components may be implemented by any conventional or other hardware devices, circuitry and/or software. Input register 150 receives the digitized input signal and is driven by the sampling clocks from local clock 59 (e.g., where the sampling clock rate is the chip rate multiplied by the number of samples per chip, S). The input shift register has a length equal to the quantity of code phases being examined, J (e.g., the input register contains input signal elements $x_{J-1}$ to $x_0$ as viewed in FIG. 4). Local code register 154 receives the local code and is driven by the code clocks having a rate substantially similar to the chip rate. Since two samples for each chip are obtained, the local code register has a length, N, of one-half of the quantity of code phases, J (e.g., local code register 154 contains code elements $h_{N-1}$ to $h_0$ as viewed in FIG. 4). Latch register 152 receives the local code from local code register 154, while multipliers 156 correlate the local code with corresponding elements of the input signal. The local code elements are combined with every other element of the input signal register (e.g., $h_{N-1}$ and $x_{J-1}$, $h_{N-2}$ and $x_{J-3}$, etc.) by respective multipliers 156 due to sampling twice for each chip as described above. The resulting N products (e.g., $y_0$ to $y_{N-1}$) from the respective multipliers are accumulated by summer 158 to produce a partial correlation value, W, for a corresponding code phase.

The partial correlation value, W, is determined for each sampling clock signal received from local clock 59. In particular, when a sampling clock signal is received by input register 154 from local clock 59, the input signal is shifted within the register by one element (e.g., one half of a chip), thereby producing a new code phase. The latch register provides the local code and a partial correlation value, W, is generated for the new code phase as described above. This process is repeated J times with the same local code in the latch register to produce partial correlation values for each of the J code phases (e.g., $W_0$ to $W_{J-1}$). In other words, the input signal is shifted each sampling clock to produce a new code phase that is subsequently applied to the local code to produce a partial correlation value for that code phase.

After J sampling clocks, the next J elements of the input signal reside in the input shift register and the latch register receives the next N elements of the local code. Although the local code is continuously stored in the local code shift register (e.g., a local code element is stored in the local code register each code clock), the latch register receives the stored local code from the local code register at intervals of every J sampling clocks from local clock 59. The input signal is shifted and subsequently applied to the local code to produce partial correlation values for the J code phases as described above. The process is repeated for the desired quantity of post detection accumulations desired, $N_{post}$, to produce a code phase magnitude.

The matched filter basically correlates the input signal to the local code in segments, where each input signal segment is shifted through J code phases to produce partial correlation values for those J code phases. In order to process additional code phases, the signal processor controls the code generator to produce a local code shifted N elements from the previous code, and the matched filter produces code phase magnitudes for the next J code phases. Thus, the matched filter basically provides correlations for a window of J code phases from the supplied local code, thereby correlating the local and received codes J code phases at a time. For example, a code length of 2047 chips and a sampling rate of two samples for each chip yields an input signal with 4094 elements for each pseudonoise code and 4094 code phases. If the matched filter examines 256 code phases (e.g., J=256 and N=128), the input register initially includes the first 256 elements of the input signal and the local code and latch registers initially include the first 128 elements of an initial phase of the local code. The input signal is shifted each sampling clock to produce a new code phase that is subsequently applied to the local code segment to generate a partial correlation value for the that code phase. After 256 clocks, the next set of 256 elements of the input signal resides in the input register and the next 128 elements of the local code reside in the latch and local code registers. The input elements are shifted each clock to produce a new code phase that is subsequently applied to the local code segment to generate a partial correlation value for that code phase. The process is repeated to correlate the 4094 input signal elements to the local code and produce correlation values for 256 code phases. In order to process subsequent code phases, the local code is shifted 128 elements and the above process is repeated to obtain correlation values for the next 256 code phases in the code phase sequence. In other words, the 4094 code phases are correlated by the matched filter 256 code phases at a time.

A new input signal segment resides in the input register every J sampling clocks and is subsequently shifted each sampling clock to produce code phases that are applied to corresponding segments of the local code as described above. Thus, the input signal segments residing in the input shift register at J clock intervals are shifted by the same amount and thereby have a common phase. These input signal segments collectively form the input signal at that code phase, where their partial correlation values may be combined to provide correlation information with respect to that code phase and the local code. Accordingly, magnitude accumulator 52 may combine the partial correlation values determined at J sampling clock intervals (e.g., values $W_0$, $W_J$, $W_{2J}$, etc. may be combined for one code phase; values $W_1$, $W_{J+1}$, $W_{2J+1}$, etc. may be combined for another code phase, etc.) to determine correlation information for each code phase.

Figure 5:
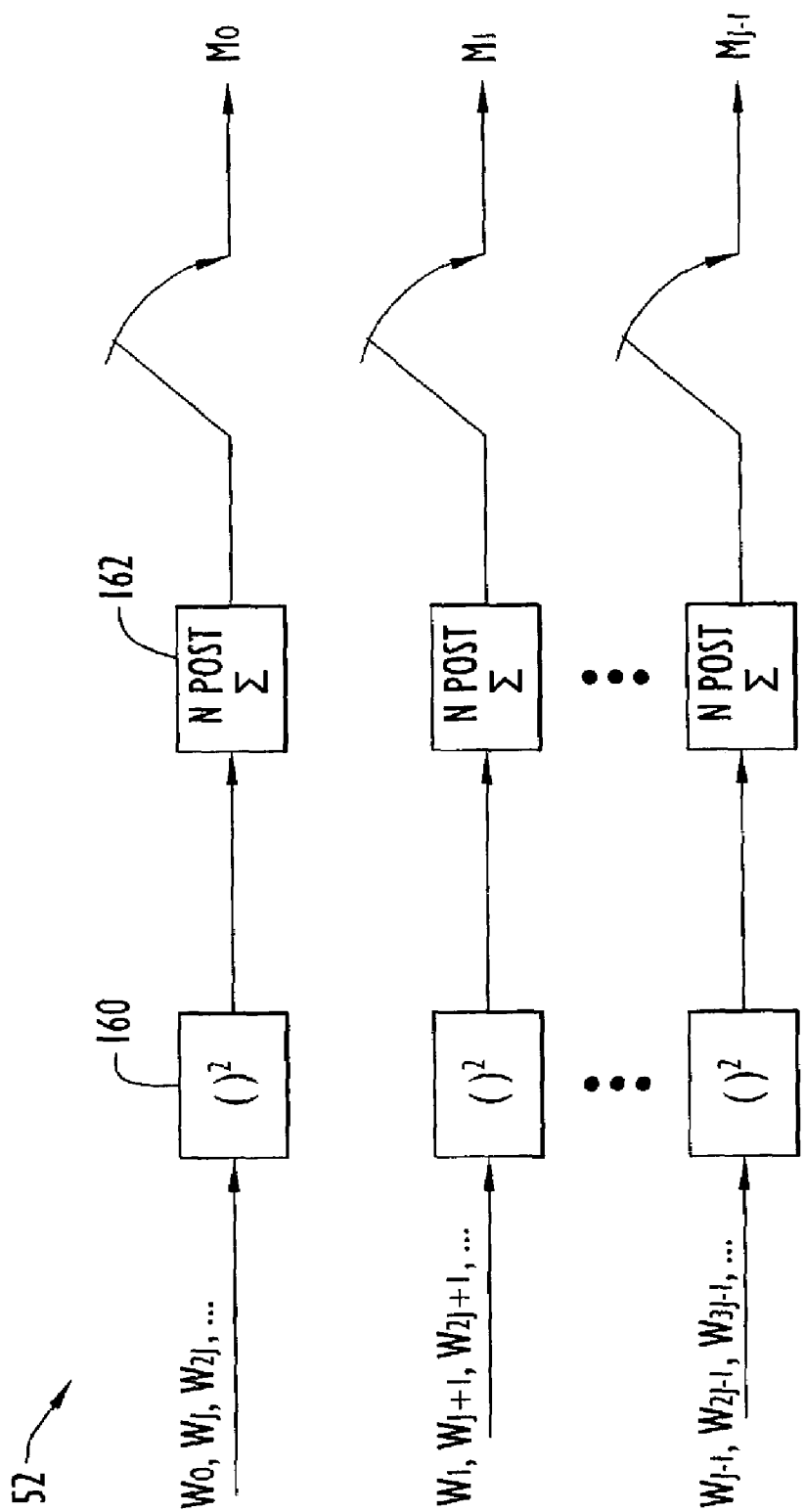
FIG. 5 is a block diagram of an exemplary cyclic PN code phase magnitude accumulator that may be employed by the present invention.

An exemplary magnitude accumulator that may be employed by the present invention is illustrated in FIG. 5. Specifically, magnitude accumulator 52 includes a series of squaring units or multipliers 160 and corresponding summers 162. These components may be implemented by any conventional or other hardware devices, circuitry and/or software. Each multiplier and summer corresponds with a particular one of the J code phases to produce a magnitude based on the partial correlation values, W, for that code phase generated by the matched filter. In other words, each multiplier receives partial correlation values for a code phase, where the magnitudes are generated at J sampling clock intervals. Each partial correlation value for a code phase is received by a corresponding multiplier 162 to produce a squared value. The squared correlation values produced by a multiplier are applied to a corresponding summer 162. The summer produces the sum of the squared correlation values that serves as a magnitude value, M, for the corresponding code phase. The parameter, $N_{post}$ received by the magnitude accumulator indicates the desired quantity of correlation values that are utilized to produce the code phase magnitudes. This parameter is selected based on detection statistics and the desired sensitivity to false alarms. The magnitude values for each code phase (e.g., $M_0$ to $M_{J-1}$ as viewed in FIG. 5) are provided to digital signal processor 60. Since there are $N_{post}$ iterations of producing J correlation values and each set of J correlation values requires J sampling clocks from local clock 59, the accumulator provides the code phase magnitudes every $Z=J \times N_{post}$ sampling clocks (or $$Z = \frac{J \times Npost}{S}$$

code clocks).

Referring back to FIG. 3, the matched filter correlation information includes "on-time" data (e.g., partial correlation values or other data related to the code phase substantially in phase with a received code), "late" data (e.g., partial correlation values or other data related to a code phase one half of one chip after the received code) and "early" data (e.g., partial correlation values or other data related to a code phase one half of one chip prior to the received code) and is transferred to tracking and signal processing modules 34, 36 (FIG. 2). The "on-time" data is further received by data stripping module 54. This module basically produces a phasor to enable measurement of the baseband carrier offset and produces complex baseband signal information. The FFT and peak search module receives the complex information and basically performs a Fast Fourier transform to measure the baseband carrier offset, Δf. The size of the FFT is based on various conditions as described above, where the FFT is typically in the range of a 256–8192 point FFT (e.g., eight to thirteen stages). The position of the maximum or peak value within the FFT output (e.g., the FFT basically produces an array of bins each associated with a magnitude, where the peak value is the largest magnitude contained within an array element or bin) corresponds to the baseband carrier offset, Δf (e.g., when the signal to noise ratio (SNR)

is of a sufficiently high magnitude). Signal processor 60 basically controls the various modules to perform pseudonoise or carrier acquisition in accordance with the present invention as described below.

Figure 6:
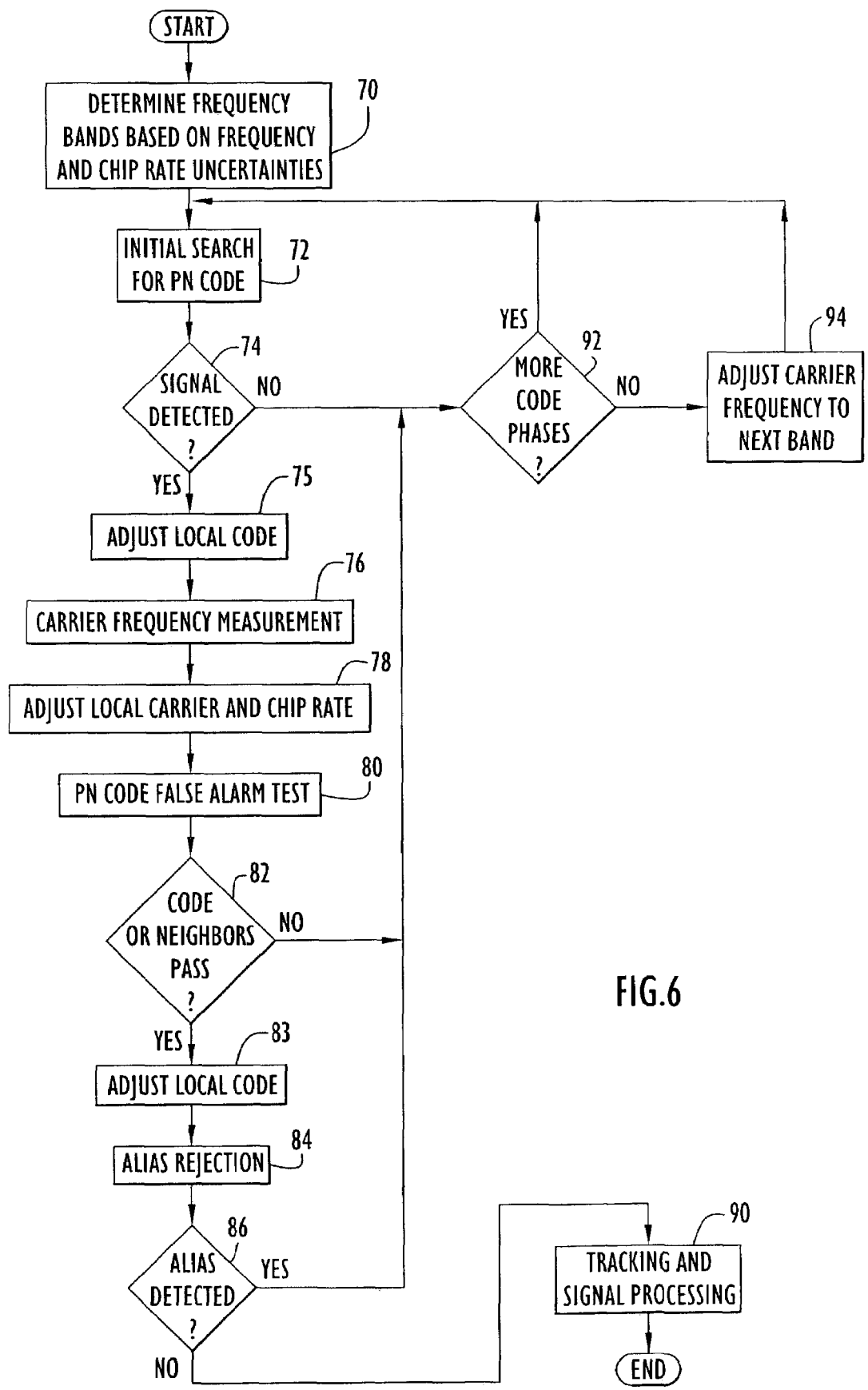
FIG. 6 is a procedural flowchart illustrating the manner in which PN code or carrier signals are acquired during conditions of relatively large chip rate uncertainty according to the present invention.

The manner in which the present invention performs pseudonoise code or carrier acquisition under conditions of large chip rate uncertainty is illustrated in FIG. 6. Initially, signal processor 60 (FIG. 3) determines at step 70 the number of bands, $N_B$, required to perform signal acquisition based on frequency uncertainty and chip rate uncertainty as described above in relation to Equations 3 and 7. The parameters for these determinations are known and/or may be entered by a user. The user or operator typically must know at least the amount of uncertainty for frequency and chip rates. The signal processor utilizes the greater of the quantity of bands for frequency and chip rate uncertainty and determines the individual bands within the uncertainty region as described above in relation to Equation 4.

Once the bands have been determined, the acquisition module performs an initial search for pseudonoise (PN) codes at step 72. Initially, the signal processor sets the frequency of the local carrier to the initial band and sets the local clock to an initial sampling clock rate. The sampling clock rate is derived from the chip rate which is proportional to the local carrier frequency. Code generator 58 is controlled by the signal processor to generate a local code with an initial phase. For example, a signal including 2047 chips within a pseudonoise code that is sampled twice for each chip produces 4094 code samples (e.g., the quantity of samples for each chip multiplied by the quantity of chips for each code). The received code samples may be shifted circularly one sample at a time to produce codes at varying phase offsets from the original code. Since each sample shift produces a phase offset (e.g., of one half of one chip since sampling occurs twice for each chip), the sampled code has 4094 code phases. These phases are preferably indexed (e.g., from 0 to 4093) and utilized sequentially and circularly to identify a particular local code substantially in phase with a received code.

Once the settings are assigned, the input signal is processed by the band pass filter, mixer (e.g., with the set local carrier signal), low pass filter and A/D converter as described above for FIG. 3. The matched filter receives the digitized values from the A/D converter and produces the code phase magnitudes for J code phases as described above in order to correlate the current local code phase with a received code. The signal processor utilizes conventional techniques to determine a threshold based on an average of the J code phase magnitudes received from the accumulator and statistical information. The code phase magnitudes are compared to the threshold to determine the phase code producing a magnitude greater than the threshold (e.g., a threshold crossing). The signal processor basically cycles through the code phases as described above (e.g., J code phases at a time as processed by the matched filter) in a circular fashion until one of the code phases produces a code phase magnitude greater than the threshold as determined at step 74. For example, a code length of 2047 chips and a sampling rate of two samples for each chip yields an input signal with 4094 elements for each code and 4094 code phases. If the matched filter examines 256 code phases (e.g., J=256 and N=128), the initial resulting J code phase magnitudes represent correlation values for the first 256 code phases. If no threshold crossing is detected, the signal processor facilitates generation of a local code shifted by 128 elements to examine the next 256 code phases. This process is repeated in order to cycle through the 4094 code phases.

When a code phase produces a magnitude exceeding the threshold, the signal processor controls the code generator at step 75 to adjust the local code based on the code phase that produced a threshold crossing. If a plurality of code phases produce magnitudes exceeding the threshold, the code phase producing the largest magnitude is selected. The local code adjustment enables the adjusted local code to be substantially in phase (e.g., within one half of one chip) with the received code. A carrier frequency measurement is subsequently performed at step 76. Specifically, the input signal is processed with the adjusted local code as described above (e.g., by band pass filter 42, mixer 44, low pass filter 46, A/D converter 48, matched filter 50, data stripping module 54, FFT and peak search module 56, etc.), where the on-time data from matched filter 50 represents the despread signal. This signal is directed to data stripping module 54 to produce complex baseband data as described above. The baseband data is processed by FFT and peak search module 56 to provide peak magnitude information (e.g., peak magnitude, position, etc.) to the digital signal processor representing a measure of the baseband carrier offset. Carrier frequency measurement basically employs "largest of detection", where the largest magnitude produced by the FFT is used to estimate the carrier frequency. The carrier frequency measurement or FFT peak may be a noise spur or an aliased version of the signal. However, these conditions are handled by the false alarm and alias rejection determinations described below.

The signal processor adjusts the local carrier frequency and local clock (e.g., thereby adjusting the chip rate) based on the carrier frequency measurement at step 78. Basically, the baseband carrier offset is applied to the current carrier frequency to produce an adjusted carrier frequency. The chip rate and carrier frequency are typically proportionally related. Accordingly, this relationship is employed to estimate the chip rate based on the adjusted carrier frequency (e.g., this type of estimation is commonly referred to as "rate aiding").

Once the carrier frequency and local clock are adjusted in response to a carrier frequency measurement, a false alarm determination is performed at step 80. A false alarm occurs when a code phase produces a threshold crossing during the initial search for a PN code, but the code or nearest code phase neighbors fail to reproduce the threshold crossing at a later time. The code phase neighbors are in the proximity of the code phase and are basically within a certain offset from the code within the indexed code phases. By way of example, the false alarm determination includes six nearest neighbors (e.g., three nearest neighbors prior to and succeeding the code phase within the index sequence, where the sequence order is circular such that the code index prior to the lowest index wraps to the highest index and the code index subsequent the highest index wraps to the lowest index). Thus, the nearest neighbors for a code phase index of 4092 within an index range of 0–4093 includes the code phases indexed 4089, 4090, 4091 and 4093, 0 and 1. The code phase neighbors are included in the false alarm determination due to the pseudonoise code phase drift that occurs during the time interval since the carrier frequency was measured. Accordingly, if the code phase that produced a threshold crossing or a neighbor produces another threshold crossing during the false alarm determination, a false alarm is not present.

The false alarm determination performs substantially the same processing as the initial search for a pseudonoise code described above. In particular, the signal processor controls code generator 58 to generate the local code phase that produced the initial threshold crossing and the signal is processed with the adjusted carrier frequency and local clock. The signal processor examines the J code phase magnitudes (e.g., which typically include the nearest neighbor code phases) produced by accumulator 52 as described above to determine the presence of a threshold crossing. When the initial code phase or any of the neighbors produce a threshold crossing as determined at step 82, a false alarm is not present and the signal processor adjusts the local code at step 83 based on the code phase producing the threshold crossing. If more than one threshold crossing occurs, the code phase (e.g., initial code phase or neighbor) producing the largest magnitude from accumulator 52 is selected for adjustment of the local code by the signal processor.

Once the local code is adjusted, an alias determination is performed at step 84. The signal processing is substantially similar to that described above for the frequency measurement. Specifically, the input signal is processed with the adjusted local code as described above, where the on-time data from matched filter 50 represents the despread signal. This signal is directed to data stripping module 54 to produce complex baseband data as described above. The baseband data is processed by FFT and peak search module 56 to provide peak magnitude information (e.g., peak magnitude, position, etc.) to the digital signal processor representing a measure of the baseband carrier offset. If the carrier frequency estimated during the carrier frequency measurement was valid (e.g., the FFT peak magnitude was not an alias or a noise spur), the largest FFT magnitude produced in the alias determination will be close to the FFT "DC component" (e.g., within five bins or elements in the FFT output array to the bin or element containing the DC component) since the local carrier frequency was adjusted close to the estimated frequency. If the largest FFT magnitude is not close to the FFT "DC component", the carrier frequency estimate is presumably invalid (e.g., the FFT peak magnitude was very likely an alias or a noise spur). When an alias is not detected (e.g., the largest FFT magnitude is sufficiently close to the FFT DC component) as determined at step 86, signal acquisition is complete and the local carrier frequency, local clock (e.g., chip rate) and code phase information are employed for subsequent receiving unit tracking and signal processing functions at step 90.

If a signal is not detected during the initial pseudonoise code search as determined at step 74, or if a false alarm or alias is detected as determined at respective steps 82, 86, the signal processor determines the presence of remaining code phases for processing. If additional code phases exist as determined at step 92, the initial search for a pseudonoise code resumes for the additional code phases. When each code phase has been processed, the signal processor sets the local carrier to the next frequency band in the sequence and an initial search for a pseudonoise code commences for that band. The above process repeatedly cycles through the bands and code phases in order to acquire a signal.

It will be appreciated that the embodiments described above and illustrated in the drawings represent only a few of the many ways of implementing a communication system and method for acquiring pseudonoise codes or carrier signals under conditions of relatively large chip rate uncertainty.

The receiver unit employing the present invention may include any quantity of any conventional or other components and may receive signals at any suitable frequency and in any suitable energy form (e.g., radio signals, microwave, optical signals, etc.).

The signal processor of the present invention may be implemented by any conventional or other microprocessor, controller or circuitry to perform the functions described herein, while any quantity of processors or processing devices or circuitry may be employed within the receiving unit, where the signal processor functions may be distributed in any fashion among any quantity of hardware or software modules, processors or other processing devices or circuits. The software for the signal processor may be implemented in any suitable computer language, and could be developed by one of ordinary skill in the computer and/or programming arts based on the functional description contained herein and the flow chart illustrated in the drawings. However, the present invention signal acquisition is preferably performed under control of firmware within the signal processor. The techniques described above and illustrated in the flow chart may be modified in any manner that accomplishes the functions described herein.

The acquisition module components (e.g., band pass filter, local oscillator, mixer, low pass filter, A/D converter, matched filter, magnitude accumulator, data stripping module, FFT and peak search module, code generator, clock, etc.) may be implemented by any quantity of any conventional or other components performing the functions described herein. These components may be implemented in hardware and/or software by any processors and/or circuitry. Alternatively, the digital signal processor may include software and/or hardware modules to implement any individual function or any combinations of these functions. The present invention may reside as an external module disposed at any suitable location and coupled to components of the receiving unit or may be integrated with any desired receiving unit components.

The band pass and low pass filters may be implemented by any type of filter to extract any desired frequency portion or range (e.g., high pass, low pass, band pass, etc.). The filters may be arranged within the acquisition module in any desired fashion and at any location that produces the desired frequency portions. The A/D converter may provide any suitable resolution (e.g., quantity of bits) and may digitize data in accordance with any desired sampling rate. The local clock may similarly produce any suitable clock signals at any desired rate or frequency. The code generator may produce any type of code of any desired length and at any desired chip or other rate. The data stripping module may process the data in any desired fashion facilitating measurement of the baseband carrier offset. The FFT and peak search may perform an FFT or any other transform (e.g., between time and frequency domains) of any size, and may identify any FFT magnitude in any fashion (e.g., largest, smallest, within a predetermined or other range, etc.).

The matched filter may be implemented by any conventional or other filter or correlator. The matched filter may be configured to produce correlations for any type of code of any desired length and for any desired sampling (e.g., any quantity of samples for each chip, etc.) or other rate (e.g., chip or other rates). The matched filter may determine correlations in any desired manner (e.g., sum of products, weights, averaging, etc.) and produce correlations for any desired quantity of code phases. The matched filter components (e.g., input shift register, latch register, code shift register, multipliers, summer, etc.) may be implemented by any quantity of any conventional or other components performing the functions described herein. These components may be implemented in hardware and/or software by any processors and/or circuitry. The registers may be of any desired lengths to accommodate the entirety or any portion of any code or input samples. The input signal, local code or both may be shifted in any fashion to determine correlation values for any quantity of code phases.

The magnitude accumulator may be implemented by any conventional or other processors or circuitry and produce any quantity of magnitudes at any desired clock intervals, where the accumulator components may be implemented by any quantity of any conventional or other devices (e.g., summers, multipliers or squaring units, etc.) arranged in any fashion. The post detection parameter may have any desired value to produce magnitudes based on any quantity of partial correlation values.

The present invention may utilize any quantity of frequency bands, where the uncertainty region may be partitioned in any manner among any quantity of bands. The present invention may combine the number of bands for frequency and chip rate uncertainty in any fashion (e.g., select the greater, average, sum, etc.). The present invention may accommodate any sampling rate, any type of code of any desired length and any quantity of code phases. The present invention is preferably utilized with Direct Sequence Spread Spectrum systems employing a Binary Phase Shift Keying modulation. However, the present invention may be utilized for carrier acquisition in any spread spectrum or other communication system employing codes and any desired modulation techniques (e.g., bi-phase, amplitude modulation, frequency modulation, etc.).

The PN search may cycle through any quantity of code phases in any desired manner (e.g., sequentially, reverse order, random, etc.). The threshold may be determined in any fashion and may be based on any quantity of code phase magnitudes or other information (e.g., matched filter data, statistical or probability information, etc.). The PN search may combine magnitudes in any fashion (e.g., average, sum, etc.), and/or may utilize any comparison (e.g., greater than, less than, etc.) of a magnitude or combination of magnitudes to the threshold to determine a threshold crossing. The PN search may further combine and/or select a code phase in any fashion when more than one code phase produces a threshold crossing (e.g., select the greater magnitude, average the code phases, etc.). The carrier frequency and local code may be updated in any fashion based on the estimates determined during the signal acquisition (e.g., estimates or offsets or any portions thereof applied to the carrier frequency and code, weighted estimates or offsets applied to the frequency and code, etc.).

The false alarm processing may employ any quantity of code phase neighbors prior to and/or after the original code phase. The false alarm processing may combine magnitudes in any fashion (e.g., average, sum, etc.), and/or may utilize any comparison (e.g., greater than, less than, etc.) of a magnitude or combination of magnitudes to the threshold to determine a threshold crossing. The false alarm processing may further combine and/or select a code phase in any fashion when more than one code phase produces a threshold crossing (e.g., select the greater magnitude, average the code phases, etc.). The alias determination may detect the presence of an alias based on any desired proximity (e.g., quantity of bins) of the peak or other magnitude to the DC or any other FFT component.

The various variables used herein (e.g., "N", "J", "S", "Z", etc.) are typically in the form of integers, but may be in any desired form and have any desired values to represent the varying characteristics of the present invention (e.g., quantity of calculations, samples, code phases, etc.). The parameters for the various determinations (e.g., uncertainties, number of post detection accumulations, etc.) may be predetermined, measured or entered by a user. The local and received codes are preferably substantially in phase when the phase difference is less than one chip. However, the present invention may utilize any suitable phase difference (e.g., any suitable quantity or portions of chips), where the resolution of the phase difference is typically based on the quantity of samples for each chip (e.g., two samples for each chip provides a one-half chip resolution, three samples for each chip provides a one-third chip resolution, etc.).

It is to be understood that the present invention is not limited to the applications described herein, but may be utilized for various applications (e.g., satellite communications, GPS, wireless communication systems, etc.). Further, the present invention may be used in any spread spectrum system operating under conditions of low signal to noise ratio and large chip rate uncertainty. In other words, the present invention enables reliable acquisition of the carrier signal, where spread spectrum is desired with conditions of large chip rate uncertainty with respect to low signal to noise ratios.

From the foregoing description, it will be appreciated that the invention makes available a novel communication system and method for acquiring pseudonoise codes or carrier signals under conditions of relatively large chip rate uncertainty, wherein signal acquisition is reliably performed under conditions of large chip rate uncertainty by considering chip rate uncertainty when determining the quantity of bands to utilize for the signal acquisition.

Having described preferred embodiments of a new and improved communication system and method for acquiring pseudonoise codes or carrier signals under conditions of relatively large chip rate uncertainty, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. In a communication system receiver utilizing a local carrier signal and a local code to respectively determine a carrier frequency of a received signal and a phase and rate of a received signal code, wherein the received signal carrier frequency and code rate each reside within a respective uncertainty region, a signal acquisition unit to acquire a transmitted signal including a code comprising:

a frequency band module to determine a quantity of frequency bands to employ for said local carrier signal to acquire said transmitted signal, wherein said frequency band module includes a band determination module to identify a quantity of frequency bands sufficient to cover said frequency uncertainty region and a quantity of frequency bands sufficient to cover said code rate uncertainty region, to compare said frequency band quantities for said frequency and code rate uncertainty regions to each other and to select the frequency bands associated with the greatest quantity as said determined quantity of frequency bands to acquire said transmitted signal; and an acquisition module to employ said determined quantity of frequency bands for said local carrier signal to determine said transmitted signal carrier frequency and said phase and code rate of said transmitted signal code in order to acquire said transmitted signal.

2. The signal acquisition unit of claim 1, wherein said transmitted signal includes a spread spectrum signal.

3. The signal acquisition unit of claim 2, wherein said spread spectrum signal includes a Direct Sequence spread spectrum signal.

4. The signal acquisition unit of claim 3, wherein said spread spectrum signal includes a Binary Phase Shift Keying modulated signal.

5. The signal acquisition unit of claim 1, wherein said acquisition module includes:
   a code search module to examine a plurality of code phases of said local code and determine a local code phase substantially in phase with said transmitted signal code;
   a frequency estimate module to employ said determined local code phase and measure a frequency offset between said carrier frequency of said transmitted signal and said local carrier signal to estimate said transmitted signal carrier frequency and code rate;
   a false alarm module to employ said frequency and code rate estimates for said local carrier and said local code and examine said determined local code phase and at least one neighbor of that code phase to identify a local code phase substantially in phase with said transmitted signal code in order to determine the presence of a false alarm, wherein said false alarm module indicates a false alarm in response to the absence of a local code phase substantially in phase with said transmitted signal code; and
   an alias module to employ said identified local code phase to determine the presence of an alias of said transmitted signal and to indicate acquisition of said transmitted signal in response to the absence of said transmitted signal alias.

6. The signal acquisition unit of claim 5, wherein said code search module includes:
   a correlator to correlate phases of said local code with said transmitted signal code and produce correlation information including correlation values for each said local code phase indicating a correlation between that code phase and said transmitted signal code;
   a threshold module to determine a threshold based on said correlation values from said correlator; and
   a threshold crossing module to compare said correlation values for each code phase to said threshold to determine said local code phase substantially in phase with said transmitted signal code.

7. The signal acquisition unit of claim 6, wherein said frequency estimate module includes:
   a local code module to supply said determined local code phase to said correlator;
   a data stripping module to receive and process said correlation information from said correlator to enable measurement of said carrier frequency offset; and
   a transform module to transform said processed correlation information from a first domain to a second domain and identify a magnitude within said transformed information indicating said carrier frequency offset.

8. The signal acquisition unit of claim 7, wherein said transform module includes:
   a Fourier module to perform a Fourier transform on said processed correlation information and identify the largest magnitude produced by said Fourier transform indicating said carrier frequency offset.

9. The signal acquisition unit of claim 7, wherein said false alarm module includes:
   a code module to determine at least one neighbor of said determined local code phase and supply said determined local code phase and said at least one neighbor to said correlator to correlate those local code phases with said transmitted signal code and produce correlation information including correlation values for each of said determined local code phase and said at least one neighbor indicating a correlation between that code phase and said transmitted signal code; and
   a threshold crossing detection module to apply said correlation values for each code phase to said threshold crossing module to identify said local code phase substantially in phase with said transmitted signal code.

10. The signal acquisition unit of claim 9, wherein said alias module includes:
    an alias detection module to apply said identified local code phase to said correlator and examine information processed by said data stripping and transform modules to identify the proximity of a magnitude within said transformed information to a particular transform component in order to determine the presence of said transmitted signal alias.

11. The signal acquisition unit of claim 10, wherein said transform module includes:
    a Fourier transform module to perform a Fourier transform on said processed correlation information;
    and said alias detection module includes:
    a transform search module to identify the proximity of a largest magnitude produced by said Fourier transform to a DC component to determine the presence of said transmitted signal alias.

12. A method of acquiring a transmitted signal including a code in a communication system receiver utilizing a local carrier signal and a local code to respectively determine a carrier frequency of said transmitted signal and a phase and rate of said transmitted signal code, wherein the transmitted signal carrier frequency and code rate each reside within a respective uncertainty region, said method comprising:
    (a) determining a quantity of frequency bands to employ for said local carrier signal to acquire said transmitted signal, wherein step (a) further includes:
       (a.1) identifying a quantity of frequency bands sufficient to cover said frequency uncertainty region and a quantity of frequency bands sufficient to cover said code rate uncertainty region; and
       (a.2) comparing said frequency band quantities for said frequency and code rate uncertainty regions to each other and selecting the frequency bands associated with the greatest quantity as said determined quantity of frequency bands to acquire said transmitted signal; and
    (b) employing said determined quantity of frequency bands for said local carrier signal to determine said transmitted signal carrier frequency and said phase and code rate of said transmitted signal code in order to acquire said transmitted signal.

13. The method of claim 12, wherein said transmitted signal includes a spread spectrum signal.

14. The method of claim 13, wherein said spread spectrum signal includes a Direct Sequence spread spectrum signal.

15. The method of claim 14, wherein said spread spectrum signal includes a Binary Phase Shift Keying modulated signal.

16. The method of claim 12, wherein step (b) further includes:

(b.1) examining a plurality of code phases of said local code and determining a local code phase substantially in phase with said transmitted signal code;

(b.2) employing said determined local code phase and measuring a frequency offset between said carrier frequency of said transmitted signal and said local carrier signal to estimate said transmitted signal carrier frequency and code rate;

(b.3) employing said frequency and code rate estimates for said local carrier and said local code and examining said determined local code phase and at least one neighbor of that code phase to identify a local code phase substantially in phase with said transmitted signal code in order to determine the presence of a false alarm, wherein said false alarm is indicated in response to the absence of a local code phase substantially in phase with said transmitted signal code; and (b.4) employing said identified local code phase to determine the presence of an alias of said transmitted signal and indicating acquisition of said transmitted signal in response to the absence of said transmitted signal alias.

17. The method of claim 16, wherein step (b.1) further includes:

(b.1.1) correlating phases of said local code with said transmitted signal code and producing correlation information including correlation values for each said local code phase indicating a correlation between that code phase and said transmitted signal code;

(b.1.2) determining a threshold based on said correlation values; and (b.1.3) comparing said correlation values for each code phase to said threshold to determine said local code phase substantially in phase with said transmitted signal code.

18. The method of claim 17, wherein step (b.2) further includes:

(b.2.1) correlating said determined local code phase with said transmitted signal code to produce said correlation information;

(b.2.2) processing said correlation information to enable measurement of said carrier frequency offset; and (b.2.3) transforming said processed correlation information from a first domain to a second domain and identifying a magnitude within said transformed information indicating said carrier frequency offset.

19. The method of claim 18, wherein step (b.2.3) further includes:

(b.2.3.1) performing a Fourier transform on said processed correlation information and identifying the largest magnitude produced by said Fourier transform indicating said carrier frequency offset.

20. The method of claim 18, wherein step (b.3) further includes:

(b.3.1) determining at least one neighbor of said determined local code phase and correlating said determined local code phase and said at least one neighbor with said transmitted signal code to produce correlation information including correlation values for each of said determined local code phase and said at least one neighbor indicating a correlation between that code phase and said transmitted signal code; and (b.3.2) determining said threshold based on said correlation values and comparing said correlation values for each code phase to said threshold to identify said local code phase substantially in phase with said transmitted signal code.

21. The method of claim 20, wherein step (b.4) further includes:

(b.4.1) correlating said identified local code phase with said transmitted signal code to produce said correlation information; and (b.4.2) processing said correlation information and transforming said processed correlation information from a first domain to a second domain to identify the proximity of a magnitude within said transformed information to a particular transform component in order to determine the presence of said transmitted signal alias.

22. The method of claim 21, wherein step (b.4.2) further includes:

(b.4.2.1) performing a Fourier transform on said processed correlation information and identifying the proximity of a largest magnitude produced by said Fourier transform to a DC component to determine the presence of said transmitted signal alias.

* * * * *